US006452150B1

(12) United States Patent
Mori et al.

(10) Patent No.: US 6,452,150 B1
(45) Date of Patent: Sep. 17, 2002

(54) CASSETTE MEASURING SYSTEM

(75) Inventors: Kunihiko Mori, Sakura; Tadao Sato, Narita, both of (JP)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 09/560,668

(22) Filed: Apr. 27, 2000

(51) Int. Cl.$^7$ .............................................. H01L 27/00
(52) U.S. Cl. .............................. 250/208.1; 250/559.19; 250/559.2; 250/559.39
(58) Field of Search ......................... 250/208.1, 559.19, 250/559.2, 559.24, 559.39, 559.08; 356/390, 392, 398, 240.1, 237.2, 237.6

(56) References Cited

U.S. PATENT DOCUMENTS

| | | | |
|---|---|---|---|
| 4,713,551 A | 12/1987 | Layman et al. | 250/561 |
| 4,786,816 A | 11/1988 | Ohmori et al. | 250/561 |
| 5,466,945 A | 11/1995 | Brickell et al. | 250/599.12 |
| 5,471,541 A * | 11/1995 | Burtnyk et al. | 382/153 |
| 5,644,140 A * | 7/1997 | Biedermann et al. | 250/559.08 |
| 5,796,486 A | 8/1998 | Jacob | 356/375 |
| 5,798,532 A | 8/1998 | Linehan | 250/599.22 |
| 5,852,300 A | 12/1998 | An | 250/599.22 |
| 6,324,298 B1 * | 11/2001 | O'Dell et al. | 382/149 |

* cited by examiner

Primary Examiner—Robert H. Kim
Assistant Examiner—Courtney Thomas
(74) Attorney, Agent, or Firm—Dugan & Dugan LLP

(57) ABSTRACT

Apparatus is provided for on-line monitoring of objects such as cassettes and similar devices used for handling semiconductor wafers to determine whether the objects remain within relevant dimensional tolerances during wafer processing. The apparatus includes a high resolution digital camera for photographing an object to provide digital images to be used to determine whether relevant dimensions of the object are within tolerance limits, and a computer for storing images of the object taken by the camera and for analyzing the images to determine whether relevant dimensions of the object are still within tolerance limits. The camera and computer operate together in accordance with a method further provided by the invention.

12 Claims, 4 Drawing Sheets

CASSETTE MEASURING SYSTEM

FIELD OF THE INVENTION

This invention relates to apparatus and method for on-line measuring of cassettes and similar devices used for handling semiconductor wafers to determine whether such devices are warped or otherwise have been distorted dimensionally during use and if the wafers are within close dimensional tolerances for flatness and shape.

BACKGROUND OF THE INVENTION

In the manufacture of semiconductors, such as integrated circuits (ICs), dynamic random access memories (DRAMs), etc., large thin wafers (typically of silicon) from which the semiconductors are fabricated must frequently be transferred from one processing location to another. This transfer of wafers must be carried out under clean conditions. It is the usual practice to load a number of wafers (e.g., several dozen) into a "cassette" so that they can be carried under clean-room conditions safely and efficiently from one piece of equipment to another, or processed in situ in the cassette. In one example the wafers are vertically spaced apart in the cassette by horizontal grooves or slots along the walls of the cassette which support opposite edges of each wafer and hold the wafers in precise locations. The wafers are fed by an automatic device of one kind or another, one-by-one into or out from their respective cassettes. It is important that each wafer be accurately held in its respective location within a cassette since an automated wafer-loading and unloading device relies on dimensions within a narrow range of tolerances in determining where to find a wafer within a cassette, or where to put the wafer. Maintenance of the dimensional accuracy and continuing structural integrity of a cassette are highly important.

Cassettes, depending on their usage, are made of materials, such as plastic, metal, quartz, or ceramic, having varying degrees of dimensional stability. In some instances wafers are processed in situ in their cassettes (e.g., during chemical cleaning and rinsing), and as a consequence the cassettes are exposed to liquids, chemical agents, large changes in temperature, etc. These factors can induce stresses in the cassettes, which stresses in turn can result in dimensional changes, warpage, etc. beyond design tolerances. When this happens wafers being inserted into or removed from a cassette can be damaged, chipped, or scratched by the automated device being used, or by the cassette itself. This in turn can leave loose fragments or chips of a wafer in the cassette to contaminate other wafers. It is desirable therefore to be able to monitor on a continuing basis the dimensional integrity, degree of warpage, etc. of cassettes and wafers as they are put through semiconductor production processes, and to detect out-of-tolerance conditions of the cassettes or their wafers before damage (or further damage) results.

SUMMARY OF THE INVENTION

In one embodiment the present invention is an apparatus comprising a camera capable of taking an image of an object, and providing at an output thereof, a digital output representative of the object and a computer. The computer has an input coupled to the output of the camera and comprises a memory capable of storing data denoting nominal dimensions of the object, and further comprises a comparator for comparing the data from the image of the object received from the camera with that stored in the memory to determine if the object has dimensions which are within a predetermined acceptable variation of the nominal dimensions.

In a second embodiment the present invention is an apparatus for on-line monitoring of objects such as cassettes and similar devices used for handling semiconductor wafers to determine whether the objects remain within relevant dimensional tolerances during wafer processing. The apparatus comprises a digital camera for photographing an object at suitable distance to provide digital images to be used to determine whether relevant dimensions of the object are within tolerance limits, the object and the camera being moved relative to each other to position them for taking pictures of one or more faces of the object, and a computer coupled to the camera for storing images of the object taken by the camera and for analyzing the images to determine whether relevant dimensions of the object are still within tolerance limits.

In a third embodiment the present invention is an apparatus for on-line monitoring of objects such as cassettes and similar devices used for handling semiconductor wafers to determine whether the objects remain within relevant dimensional tolerances during wafer processing. The apparatus comprises digital camera means for photographing an object at suitable distance to provide digital images to be used to determine whether relevant dimensions of the object are within tolerance limits, means for moving the object and the camera relative to each other to position them for taking pictures of one or more faces of the object, and a computer. The computer is coupled to the means for moving and to the camera for storing images of the object taken by the camera and for analyzing the images to determine whether relevant dimensions of the object are still within tolerance limits.

In a fourth embodiment the present invention is a method for comparing dimensions of an object and determining if the dimensions are within predetermined acceptable variations from nominal dimensions of the object. The method comprises the steps of: taking an image of the object; and inputting the image of the object to a computer which comprises a memory capable of having stored therein nominal dimensions of the object, and a comparator capable of comparing the stored nominal dimensions of the object with the data contained in the image of the object so as to determine if the actual dimensions of the object are within predetermined acceptable variations from the nominal dimensions of the object.

In a fifth embodiment the present invention is a method for continual monitoring of structural integrity of objects such as cassettes and related devices used in handling semiconductor wafers during the processing thereof. The method comprises the steps of: obtaining digital images of relevant surfaces and faces of an object; storing the digital images in computer memory; analyzing the digital images to obtain relevant dimensional data of the object; and comparing the dimensional data of the object with corresponding ideal dimensional data of the object to determine whether the dimensions of the object are still within acceptable limits or tolerances.

In a sixth embodiment the present invention is a method for measuring relevant dimensions of objects such as cassettes and related devices used in handling semiconductor wafers during the processing thereof. The method comprises the steps of: obtaining digital images of surfaces and faces of an object, the images having sufficient resolution to detect dimensional changes of a few microns; storing the digital images in computer memory; analyzing the digital images to obtain relevant dimensional data of the object; and determining whether the dimensional data of the object lie within acceptable limits of variation of the dimensions of the object.

A better understanding of the invention will best be gained from a study of the following description and claims given in conjunction with the accompanying drawings.

The drawings are not necessarily to scale.

DETAILED DESCRIPTION OF THE DRAWINGS

Figure 1:
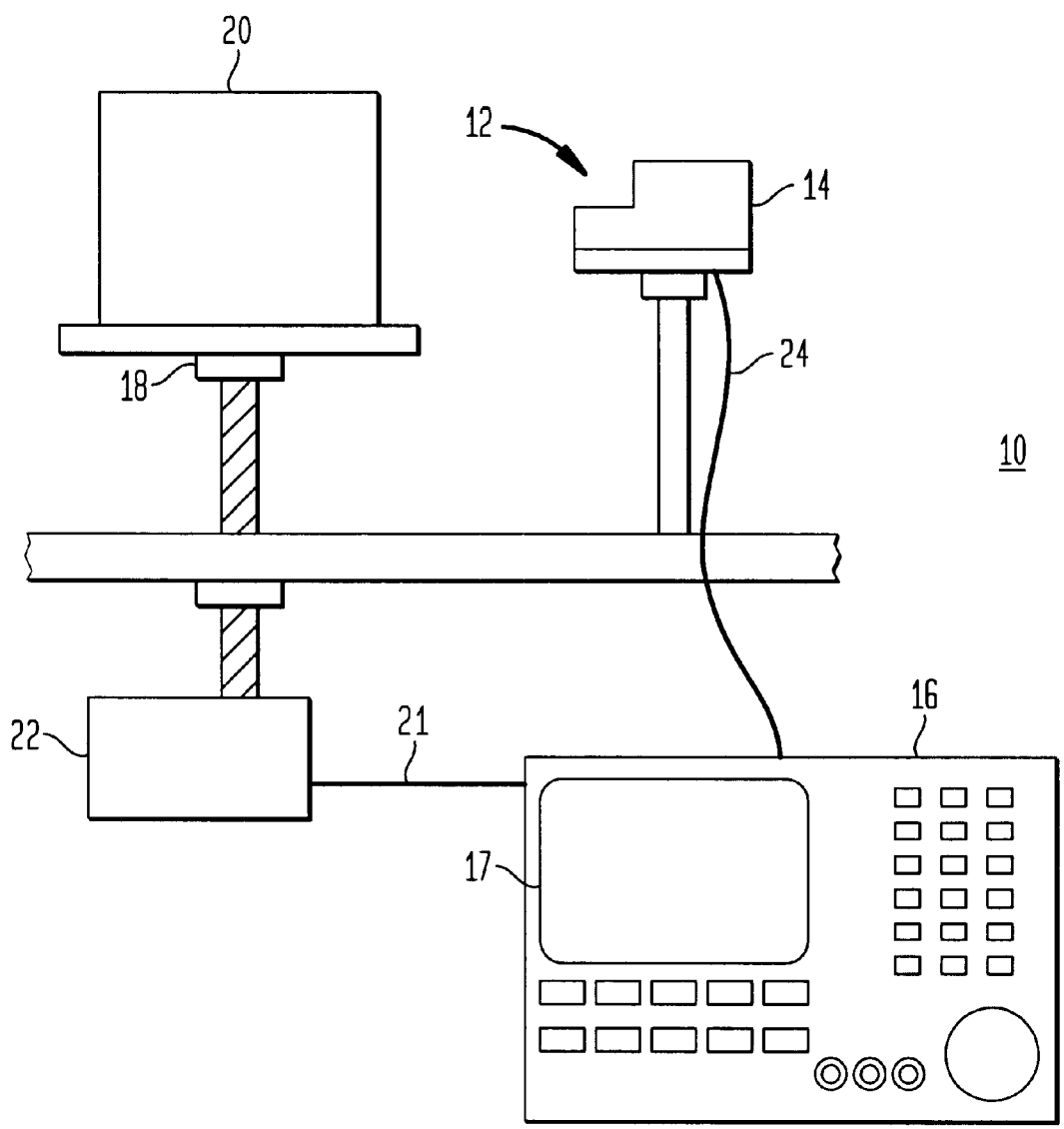
FIG. 1 is a schematic representation of an apparatus, provided in accordance with the present invention, for on-line monitoring of objects such as a cassette and similar devices used for handling semiconductor wafers to determine whether the objects remain within dimensional tolerances during wafer processing.

Referring now to FIG. 1, there is schematically shown an apparatus 10 provided in accordance with the present invention, for monitoring the dimensional integrity (flatness, squareness, freedom from distortion and warpage, etc.) of devices such as cassettes used in the processing of semiconductor wafers. The apparatus 10 comprises an array 12 of one or more digital CCD cameras 14, a computer 16 having a display screen 17, a moveable platform 18 on which is placed an "object" such as a cassette 20 whose dimensional integrity is to be measured, and a controller 22 for properly placing the platform 18 and the cassette 20 a chosen distance in front of the camera array 12 and for rotating the platform 18 and the cassette 20 as desired so that relevant surfaces can be photographed. Each camera 14 of the array 12 is connected to the computer 16 by an electric signal and control cable 24. The controller 22 is coupled to the computer 16 by connection means 21.

The computer comprises, an electronic data processor (not shown), a memory (not shown) capable of storing data denoting nominal dimensions of the object, and a comparator (not shown) for comparing the data from the image of the object received from the camera with that stored in the memory to determine if the object has dimensions which are within a predetermined acceptable variation of the nominal dimensions.

To obtain higher resolution of the images of an object than is attainable by a single camera 14, the camera array 12 has, by way of example, five high-resolution CCD cameras 14 each of which is focused on a respective different part of a face of the object (e.g., the cassette 20) so that the whole face of the object is photographed at the same time. The individual images taken by the cameras 14 are then "stitched" together to form a seamless "whole" or composite image. This is accomplished by transmitting the respective digital image data from each camera 14 to the electronic processor and computer 16 which uses a "patchwork function" program (well known in the art) to generate a "whole" or composite digital image of the object as is explained below.

Figure 2:
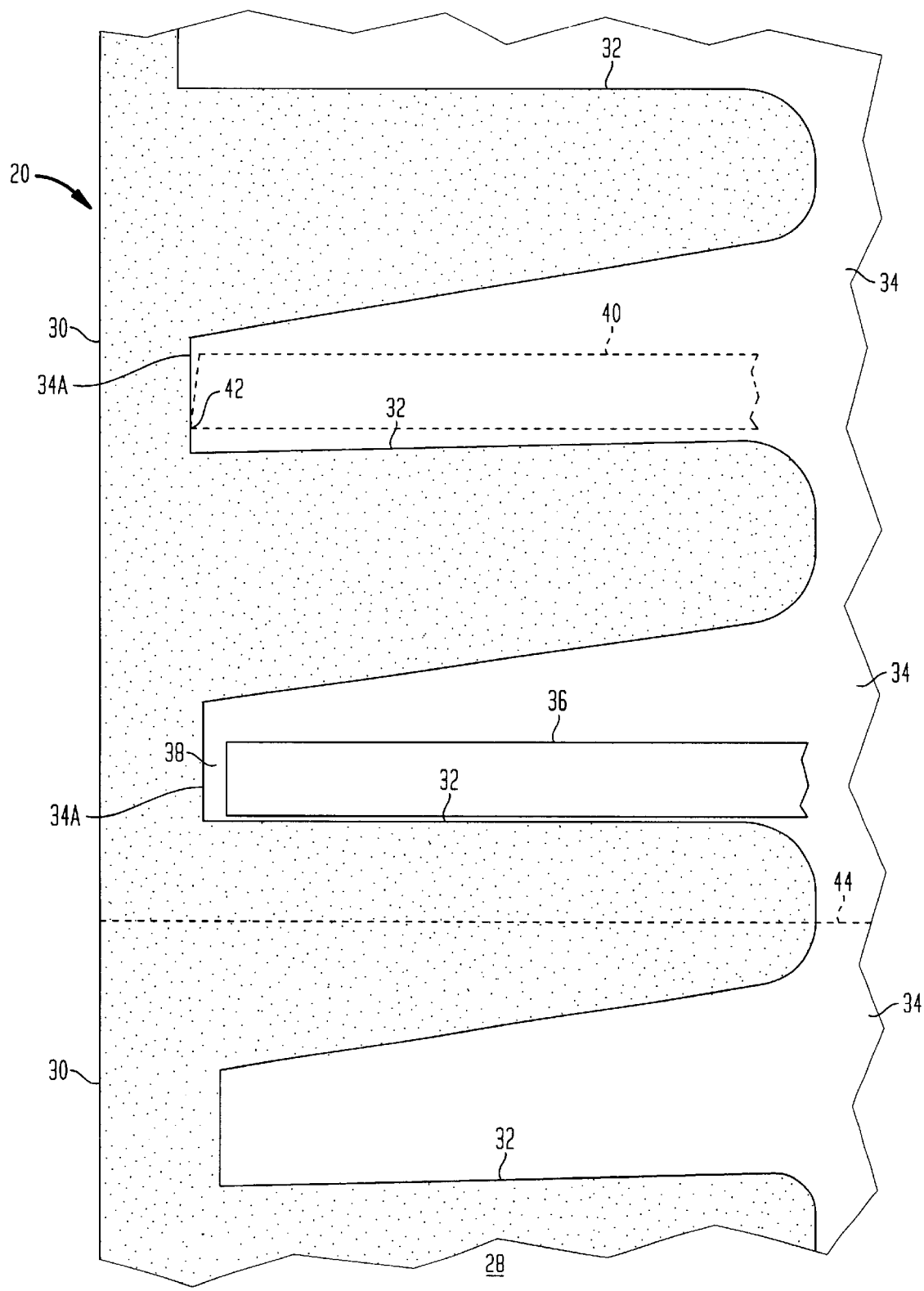
FIG. 2 shows, greatly enlarged and partially broken away, a digital image of a front edge of a cassette.

Referring now to FIG. 2, there is shown, largely broken away, a greatly enlarged "whole" image 28, such as may be displayed on the screen 17 of the computer 16. The image 28 is of a front edge of the cassette 20 of FIG. 1 (the other edge not shown, and being a mirror-image) and shows a side wall 30 having horizontal shoulders 32 defining slots, indicated at 34, vertically spaced along the wall 30. A wafer 36 is shown properly resting on a shoulder 32 within a respective slot 34. There is adequate clearance, indicated at 38, between an inner vertical portion 34A of the wall 30 and an edge of the wafer 36. Thus the wafer 36 can easily and smoothly be withdrawn, or inserted, into the cassette 20 without damage to either. On the other hand, a wafer 40 shown in dashed outline (in a slot above) is shown as resting improperly on a shoulder 32 and butted against the wall portion 34A at a location 42 thereof in the event the cassette 20 had become somewhat warped (not shown here). Such a condition would indicate that the wafer 40 had been forced into its slot 34 and possibly damaged, and in any event is undesirable.

In FIG. 2, an image taken by one CCD camera 14 has been seamlessly "stitched" to an image taken by an adjacent camera 14, as indicated by a dashed line 44, and so on. Thus a "whole" image 28 of the cassette 20, as illustrated in FIG. 2, can be displayed on the screen 17. There is no visual indication of "seams" between the individual images from the cameras 14. Resolution in an enlarged image 28 such as shown, by virtue of using a plurality of CCD cameras 14, can be of the order of ±3 microns and is adequate to detect undesirable variations in the shape, flatness, squareness, etc. of the cassette 20, or a wafer 36. Images, such as the image 28, are stored in the memory of the computer 16 and are easily compared with each other to detect out-of-tolerance conditions of the object pictured (e.g., the cassette 20), which conditions may develop during its service life.

Figure 3:
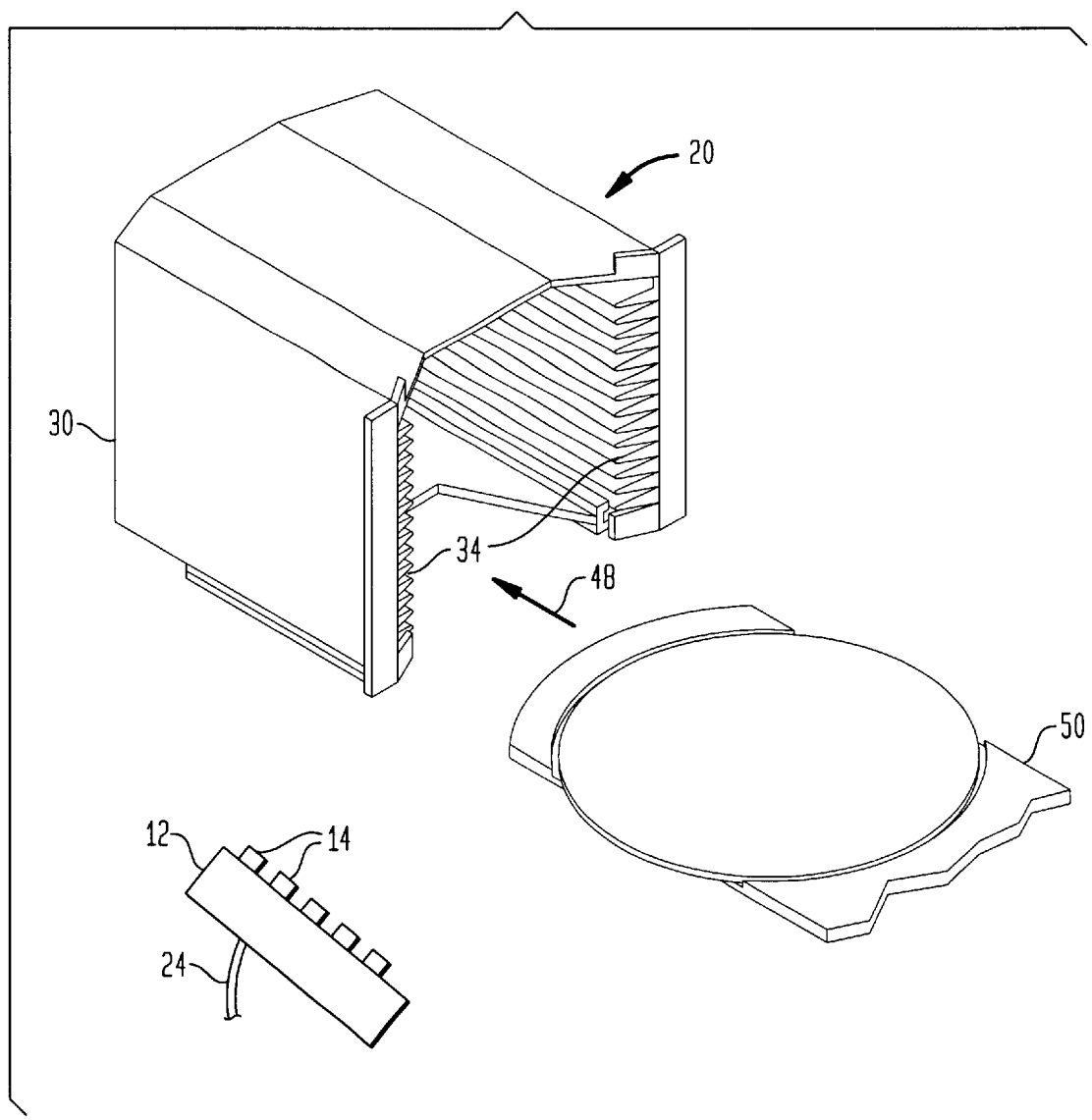
FIG. 3 is a schematic representation of a digital camera array positioned to photograph a cassette and a wafer W being inserted into it by a wafer handling mechanism.

Referring now to FIG. 3, there is schematically shown the cassette 20, a wafer 36, and the array 12 of cameras 14 positioned to photograph the wafer 36 as it is being inserted along an axis 48 by an automated wafer handling mechanism 50 (shown partly broken away) into a selected pair of horizontal slots 34 in the cassette 20. The mechanism 50 has been moved to a desired level relative to the cassette 20 and aligned along a selected axis 48 so that the wafer 36 will slide into the selected slots 34 without obstruction. Of course, this depends upon the dimensions and shape of the cassette 20 being within design tolerances, that the wafer 36 remains essentially flat, and that the mechanism 50 has not been bent or otherwise deflected out of position during processing of wafers 36. The camera array 12 also detects excessive and unwanted vibration in the movement of the mechanism 50. These out-of-tolerance conditions are monitored and detected on an on-going basis by the camera array 12. Moreover, the camera array also monitors the inventory and placement of wafers 36 as they are being put into and taken out of a cassette 20. In this way proper selection and tracking of the wafers 36 as they are processed are assured.

The digital images of an object or objects stored in memory in the computer 16 are advantageously analyzed by a "finite element" method using a computer program well known in the art. By this method images are divided into a myriad of discrete finite elements having dimensional "X", "Y", and "Z" coordinates. These elements can then be displayed on the computer screen 17 as a "skeletonized" image of an object in which, for example, distortion of the object (e.g., warping of the cassette 20), is easily seen or numerically measured.

Figure 4:
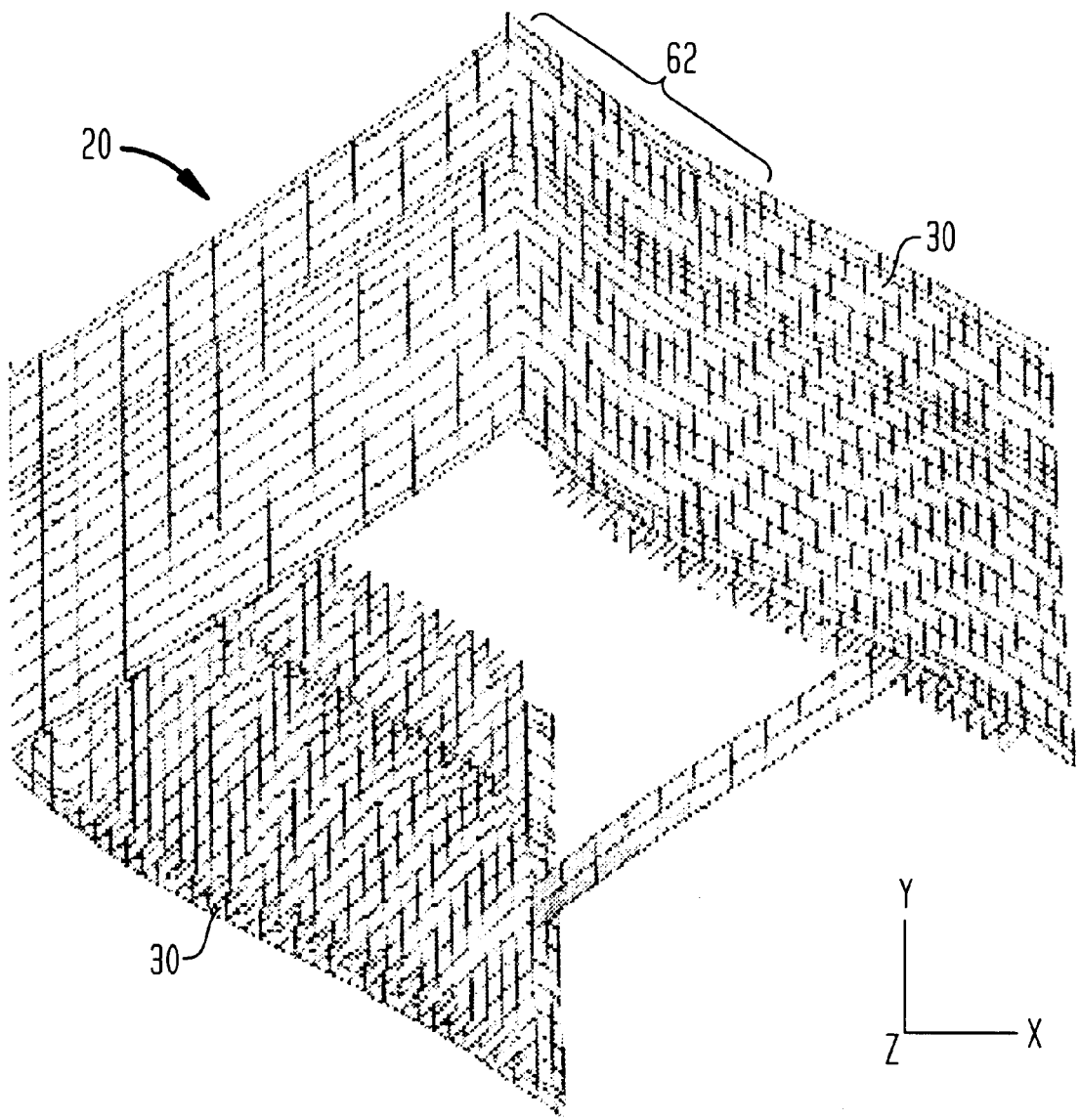
FIG. 4 is an image formed of "finite elements" of a cassette showing a degree of warpage in a wall of the cassette.

Referring now to FIG. 4 there is shown by way of example, an image 60 formed of "finite elements", having "X", "Y" and "Z" dimension coordinates, computed from stored digital images of the cassette 20 (e.g., such as the image 28 of FIG. 2). The image 60, which may be displayed on the computer screen 17, shows a skeletonized three-dimensional view of the cassette 20. Warpage of a side wall 30 of the cassette 20 such as indicated by a bracket 62, is clearly evident. The degree of warpage, and whether it is dimensionally out of tolerance and whether the cassette should be withdrawn from service, is numerically determined by the computer 16 in accordance with a method provided by the invention. This is accomplished by comparing the data represented by the image 60 element-by element and dimension-by-dimension with corresponding data stored in the computer of a cassette 20 with "perfect" or design-centered dimensions, together with all relevant dimensional tolerances or limits. In this way the dimensional integrity of the cassette 20 with a complement of wafers 36 and of the handling mechanism 50 is monitored on an on-going basis during wafer processing, and any out-of-tolerance condition detected and acted upon.

The cameras 14, which are commercially available, are identical to each other. More or fewer numbers of the cameras 14 than the five mentioned above may be used, depending on the size of an object to be photographed. Each camera had a 20 to 50 mm. focal length lens and a resolution of about 2 million pixels. An object to be photographed was placed in one example about 200 mm from the cameras 14. The cameras 14 themselves may be moved instead of the object to be photographed. The computer 16, and its stored programs, are well known in the art. The apparatus 10 can operate automatically, and give appropriate warning or stop signals when out-of-tolerance conditions of an object begin to develop or reach a set limit.

The above description of the invention is intended in illustration and not in limitation thereof. Various changes or modifications in the embodiment set forth may occur to those skilled in the art and may be made without departing from the spirit and scope of the invention as set forth in the accompanying claims.

What is claimed is:

1. Apparatus for on-line monitoring of objects such as cassettes and similar devices used for handling semiconductor wafers to determine whether the objects remain within relevant dimensional tolerances during wafer processing, the apparatus comprising:
    a first digital camera for photographing an object at suitable distance to provide digital images to be used to determine whether relevant dimensions of the object are within tolerance limits, the object and the camera being moved relative to each other to position them for taking pictures of one or more faces of the object;
    a computer coupled to the camera for storing images of the object taken by the camera and for analyzing the images to determine whether relevant dimensions of the object are still within tolerance limits; and
    at least one additional camera identical to the first, the cameras photographing respective parts of a whole object, the individual camera pictures being assembled by the computer into a composite digital image having greater resolution than obtainable with a single camera alone.

2. The apparatus of claim 1 in further combination with a moveable platform and controller coupled to the computer for positioning the object and cameras in desired relation to each other.

3. The apparatus of claim 1 wherein the computer analyzes digital images of the object to obtain finite element data of relevant dimensions of the object, and compares such data with similar data stored in the computer giving desired dimensions of the object and related tolerance limits which should not be exceeded.

4. Apparatus for on-line monitoring of objects such as cassettes and similar devices used for handling semiconductor wafers to determine whether the objects remain within relevant dimensional tolerances during wafer processing, the apparatus comprising:
    digital camera means for photographing an object at suitable distance to provide digital images to be used to determine whether relevant dimensions of the object are within tolerance limits;
    means for moving the object and the camera relative to each other to position them for taking pictures of one or more faces of the object; and
    a computer coupled to the means for moving and to the camera for storing images of the object taken by the camera and for analyzing the images to determine whether relevant dimensions of the object are still within tolerance limits;
    wherein the camera means comprises a plurality of digital CCD cameras, the cameras photographing respective parts of a whole object, the individual camera pictures being assembled by the computer into a composite digital image having greater resolution than obtainable with a single camera alone.

5. The apparatus of claim 4 wherein the means for moving comprises a moveable platform and controller coupled to the computer for positioning the object and camera in desired relation to each other.

6. A method for continual monitoring of structural integrity of objects such as cassettes and related devices used in handling semiconductor wafers during the processing thereof, the method comprising the steps of:
    obtaining digital images of relevant surfaces and faces of an object;
    storing the digital images in computer memory;
    analyzing the digital images to obtain relevant dimensional data of the object; and
    comparing the dimensional data of the object with corresponding ideal dimensional data of the object to determine whether the dimensions of the object are still within acceptable limits or tolerances.

7. The method of claim 6 wherein the high resolution images are obtained by combining images from a plurality of digital cameras each of which photographs a respective part of the object at the same time; and the combined digital images are analyzed by finite element analysis to give dimensional X, Y and Z data of relevant surfaces and faces of the object.

8. A method for measuring relevant dimensions of objects such as cassettes and related devices used in handling semiconductor wafers during the processing thereof, the method comprising the steps of:
    obtaining digital images of surfaces and faces of an object, the images having sufficient resolution to detect dimensional changes of a few microns:
    storing the digital images in computer memory;
    analyzing the digital images to obtain relevant dimensional data of the object; and
    determining whether the dimensional data of the object lie within acceptable limits of variation of the dimensions of the object.

9. A method for continual monitoring of cassettes and the wafers contained therein during processing of the wafers, the method comprising the steps of:
    obtaining digital images on an on-going basis of wafers being put into and taken out of a cassette during processing;
    storing the digital images in computer memory;
    analyzing the digital images to obtain relevant data tracking the inventory and placement of the wafers; and
    comparing the analyzed data with stored data to insure that the wafers are properly selected and replaced in desired sequences during processing.

10. A method for monitoring a cassette used in handling semiconductor wafers, the method comprising:

obtaining digital images of surfaces of the cassette;

storing the digital images in computer memory;

analyzing the digital images to obtain dimensional data of the cassette; and determining based on the dimensional data whether the cassette is warped or otherwise distorted dimensionally.

11. The method of claim 10 wherein the step of obtaining digital images of surfaces of the cassette includes combining images from a plurality of digital cameras each of which photographs a respective part of the cassette at the same time.

12. The method of claim 11 wherein the combined digital images are analyzed by finite element analysis.

* * * * *